United States Patent
Van Oosten (10) Patent No.: US 10,705,365 B2
(45) Date of Patent: Jul. 7, 2020

(54) DEVICE FOR THE REGULATION OF LIGHT TRANSMISSION

(71) Applicant: MERCK PATENT GMBH, Darmstadt (DE)

(72) Inventor: Casper Laurens Van Oosten, Waalre (NL)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/745,317

(22) PCT Filed: Jun. 20, 2016

(86) PCT No.: PCT/EP2016/001049
§ 371 (c)(1),
(2) Date: Jan. 16, 2018

(87) PCT Pub. No.: WO2017/008881
PCT Pub. Date: Jan. 19, 2017

(65) Prior Publication Data
US 2018/0210272 A1    Jul. 26, 2018

(30) Foreign Application Priority Data

Jul. 16, 2015 (EP) .................................... 15002125

(51) Int. Cl.
*G02F 1/1333* (2006.01)
*E06B 9/24* (2006.01)
*B32B 17/10* (2006.01)

(52) U.S. Cl.
CPC .. *G02F 1/133377* (2013.01); *B32B 17/10504* (2013.01); *E06B 9/24* (2013.01);
(Continued)

(58) Field of Classification Search
CPC ... G02F 1/133377; G02F 2001/133391; G02F 2001/133374; E06B 9/24;
(Continued)

(56) References Cited

U.S. PATENT DOCUMENTS 5,936,690 A    8/1999 Koden et al.
6,864,931 B1    3/2005 Kumar et al.
(Continued)

FOREIGN PATENT DOCUMENTS

EP    2093606 B1    1/2016
JP    6216931 U    1/1987
(Continued)

OTHER PUBLICATIONS

International Search report from PCT/EP2016/001049 dated Sep. 2, 2016.
(Continued)

*Primary Examiner* — Phu Vu
(74) *Attorney, Agent, or Firm* — Millen White Zelano & Branigan, PC; Brion P. Heaney (57) ABSTRACT

The present application concerns a switchable device for the regulation of light transmission, which has a compartmented structure, where the switching state of each of the compartments can be controlled individually.

17 Claims, 2 Drawing Sheets

(52) U.S. Cl.
CPC ............... *E06B 2009/2405* (2013.01); *E06B 2009/2464* (2013.01); *G02F 2001/133374* (2013.01); *G02F 2001/133391* (2013.01)

(58) Field of Classification Search
CPC ..... E06B 2009/2464; E06B 2009/2405; B32B 17/10055; B32B 17/10504
See application file for complete search history.

(56) References Cited

U.S. PATENT DOCUMENTS

| | | | |
|---|---|---|---|
| 8,525,967 B2 | 9/2013 | Ito et al. | |
| 2006/0249708 A1* | 11/2006 | Dubois | C09K 19/42 252/299.61 |
| 2008/0316395 A1 | 12/2008 | O'Keeffe | |
| 2009/0161195 A1 | 6/2009 | Jang | |
| 2009/0290078 A1* | 11/2009 | Yang | G02F 1/13718 349/16 |
| 2009/0323160 A1* | 12/2009 | Egerton | G02F 1/0147 359/275 |
| 2013/0128213 A1* | 5/2013 | Ito | G02F 1/1341 349/153 |
| 2014/0022609 A1 | 1/2014 | Tanigawa | |
| 2014/0232960 A1* | 8/2014 | Schwartz | G02B 26/004 349/12 |
| 2015/0299577 A1* | 10/2015 | Junge | C09K 19/60 252/299.1 |
| 2016/0124284 A1* | 5/2016 | O'Keeffe | G02F 1/167 359/296 |
| 2016/0262467 A1* | 9/2016 | Magnusson | G02F 1/1333 |
| 2017/0336663 A1* | 11/2017 | Hakemi | C09K 19/02 |

FOREIGN PATENT DOCUMENTS

| | | |
|---|---|---|
| JP | 2002067690 | 3/2002 |
| JP | 2002537580 T2 | 11/2002 |
| WO | 2014191233 A1 | 12/2014 |

OTHER PUBLICATIONS

Third Party Observations in corresponding EP3323014 dated Nov. 13, 2019 (pp. 1-18).
Search report for corresponding EP 16733296.4 dated May 14, 2019 (pp. 1-5).
Third party observations in corresponding EP 16733296.4 dated Jul. 9, 2019 (pp. 1-9).
Search Report in corresponding EP16733296.4 application dated Mar. 26, 2020(pp. 1-4).

* cited by examiner

DEVICE FOR THE REGULATION OF LIGHT TRANSMISSION

The present application concerns a switchable device for the regulation of light transmission, which has a compartmented structure, where the switching levels of each of the compartments can be set individually.

Switchable devices for the regulation of light transmission are understood to be devices having at least two states, where in one of these states (the dark state or scattering state), they allow only a small proportion of the incident light to pass through at all, or they allow only a small proportion of the incident light to pass through unscattered, while in another of these states (the clear state), they allow a large proportion of the incident light to pass through unaltered. Due to this function, they have attracted considerable interest, in particular for use in architecture or automotive applications, to improve the indoor climate and light conditions. Typically, these devices are switched from one state to the other by application of a voltage across a switching layer which comprises a functional material.

Different technical solutions have been proposed and are commercially used for this purpose, among them liquid crystal (LC) based switchable devices, electrochromic switchable devices and suspended particle based switchable devices. Among the liquid crystal based switchable devices, the ones based on dye doped small molecule liquid crystals (ddLC), and the ones based on polymer dispersed liquid crystals are of currently high technical relevance. A review of the different technical solutions is given, for example, in R. Baetens et al., Solar Energy Materials & Solar Cells, 2010, 87-105.

The invention provides a single switchable glazing device wherein the achievable transmission range varies over the surface of the switchable glazing device. The achievable switching range can be set per certain areas of the device during the production. This is achieved by providing locally different device compositions and material compositions.

Multi stack ddLC devices are known, but in those cases they were commonly stacked on top of each other, and not in the plane. For example, US2013048836 discloses such a stack of two cells with different LC mixtures.

WO2014/126974 discloses a liquid crystal device having one or more liquid crystal cells, each cell having an electrochromo-dynamic (ECD) mixture interposed between two substrates covered with a conductive layer. The ECD mixture includes a liquid crystal material, dichroic dyes and an ionic material capable of inducing dynamic scattering of liquid crystal molecules. The device has a voltage supply coupled with the conductive layers for applying a voltage waveform across the liquid crystal cell, such that upon application of a first voltage waveform, the device is in a CLEAR (low-haze, low-tint) state, and upon application of a second voltage waveform, the device achieves an OPAQUE (high-haze, high-tint) state. In some cases, the device is configured so that upon application of a third voltage waveform, the device achieves a TINTED (low-haze, high-tint) state.

This invention is particularly suitable for switchable glazing applications where a high (>50%) transmission is required. For lower transmissions, the existing LCD technology with color filters and polarizers can achieved different large contrasts. However, a polarizer based device cannot reach more than 50% transmission and is thus not suitable for all applications, such as, for example, in automotive applications, where a high transmission over 70% is mandatorily required.

The devices in accordance with the present invention are especially suitable for mass production since their layout and their processing are less complex than for the alternative devices of the prior art. No additional electronics or components are required and in particular, no additional processing steps compared to the standard mass production of switchable liquid crystalline devices are required.

The devices in accordance to the present invention can be produced in a slim, thin and lightweight manner. It is also possible to provide curved devices.

In addition, modern temperature-reactive devices have to fulfil a number of requirements, which are amongst others,
  a high efficiency over a prolonged period of use,
  a high stability against solar irradiation, especially UV radiation,
  a favourable adaption of the energy flow through glass surfaces to the ambient temperature conditions,
  a high durability in an environment where it is externally exposed especially regarding cold and heat.

The invention therefore relates to a switchable device for the regulation of light transmission, comprising a stack of layers which comprises a first substrate layer, a second substrate layer, a compartmented switching layer which is positioned between the first and the second substrate layer comprising at least two separated compartments, a first conductive layer which is positioned between the compartmented switching layer and the first substrate layer, and a second conductive layer which is positioned between the compartmented switching layer and the second substrate layer, where each of separated compartments of the switching layer comprise a material which changes its light transmissivity upon the application of voltage.

Terms and Definitions

For the purposes of the present invention, the term "liquid-crystalline material" is taken to mean a material, which exhibits liquid-crystalline properties under certain conditions. In particular, the term is taken to mean a material, which forms a nematic liquid-crystalline phase under certain conditions. A liquid-crystalline medium may comprise one or more liquid-crystalline compounds and in addition further substances.

The term "liquid-crystalline compound" is taken to mean a compound, which exhibits liquid-crystalline properties under certain conditions, and in particular a compound, that forms a nematic liquid-crystalline phase under certain conditions or that forms a nematic liquid-crystalline phase upon mixing with other liquid-crystalline compounds.

The term "alignment" or "orientation" relates to alignment (orientation ordering) of anisotropic units of material such as small molecules or fragments of big molecules in a common direction named "alignment direction". In an aligned layer of liquid-crystalline material the liquid-crystalline director coincides with the alignment direction so that the alignment direction corresponds to the direction of the anisotropy axis of the material.

The term "planar orientation/alignment", for example in a layer of an liquid-crystalline material, means that the long molecular axes (in case of calamitic compounds) or the short molecular axes (in case of discotic compounds) of a large proportion of the liquid-crystalline molecules are oriented substantially parallel (about 180°) to the plane of the layer.

The term "homeotropic orientation/alignment", for example in a layer of an liquid-crystalline material, means that the long molecular axes (in case of calamitic compounds) or the short molecular axes (in case of discotic compounds) of a large proportion of the liquid-crystalline molecules are oriented at an angle θ ("tilt angle") between about 80° to 90° relative to the plane of the layer.

As with the common dyes, a "dichroic dye" absorbs light when exposed to the correct wavelength. The dichroic dye make use of the dichroic absorption: light with polarization along the absorption transition dipole is absorbed while light with polarization perpendicular to the dipole is not absorbed.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

A conductive layer is, for the purposes of the present application, understood to be a layer which conducts electricity in a sufficient manner to enable an electrical field to be created between the two major faces of the switchable layer, if the switchable layer is positioned between two conductive layers, one on each of the major faces of the switchable layer, when a voltage source having a low voltage is connected to it and to a second conductive layer positioned on the opposite side of the switching layer.

Furthermore, the definitions as given in C. Tschierske, G. Pelzl and S. Diele, Angew. Chem. 2004, 116, 6340-6368 shall apply to non-defined terms related to liquid crystal materials in the instant application.

For the purposes of the present application, the term light transmission is taken to mean the passage of electromagnetic radiation in the visible (VIS), near infrared (near-IR, NIR) and UV-A region through the device.

The term "light" in the present application is correspondingly likewise taken to mean electromagnetic radiation in the visible, near infrared and UV-A region of the spectrum. In accordance with physical definitions usually used, UV-A light, visible light and near infrared light together are taken to mean radiation having a wavelength of 320 to 3000 nm.

DETAILED DESCRIPTION

In accordance with the invention, the two substrate layers may consist, inter alia, each and independently from another of a polymeric material, for example PET foil, of metal oxide, for example ITO, of glass and/or of metal.

In a preferred embodiment, the substrates are arranged with a separation of at least 1 μm from another, preferably at least 3 μm from another, and more preferably at least 5 μm from another, where the compartmented switching layer are located in the interspace. Preferably, the cell gap is not more than 100 micrometers, more preferably less than 50 microns, and most preferably less than 25 micrometers.

The substrate layers can be kept at a defined separation from another by, for example, transparent spacers, or projecting structures in the layer. Typical spacer materials are commonly known to the expert, as for example spacers made of plastic, silica, epoxy resins, etc.

In a further preferred embodiment of the invention, the compartmented switching layer is located between two flexible layers, for example flexible polymer films. The device according to the invention is consequently flexible and bendable and can be rolled up, for example. The flexible layers can represent the substrate layers, the alignment layers, and/or polarizers. Further layers, which are preferable flexible, may also, be present. For a more detailed disclosure of the preferred embodiments, in which the layer of the liquid-crystalline medium is located between flexible layers, reference is given to the application US 2010/0045924.

Preferably, the conductive layer of the switchable device in accordance with the present invention can be made from a thin layer of metal, preferably silver, or of other material, where the other material is preferably selected from metal oxide, more preferably from transparent conductive metal oxide (TCO), particularly preferably from indium tin oxide (ITO), fluorinated tin oxide (FTO), and aluminium doped tin oxide (AZO), or from silver nanowires, carbon nanotubes, graphene, conductive polymers, in particular PEDOT:PSS, a metal mesh, or silver nanoparticles.

It is furthermore preferred that the first and the second conductive layer are rectangular. Under certain circumstances, in particular when the windows are used in vehicles, such as e.g. cars, it is preferred that the windows have a non-rectangular form.

It is preferred that in the stack of layers of the switchable device, the first conductive layer is directly adjacent to the first substrate layer, and the second conductive layer is directly adjacent to the second substrate layer. It is particularly preferred that the first conductive layer and the first substrate layer are formed by a first sheet of glass or polymer coated with a layer of metal or other material, as disclosed above for the conductive layer, and the second conductive layer and the second substrate layer are formed by a second sheet of glass or polymer coated with a layer of metal or other material, as disclosed above for the conductive layer.

In all cases above and below, it is likewise preferred to combine the compartmentalization of the switching layer with patterning of the conductive layer such that parts of the device can be switched separately. In another preferred embodiment the conductive layer patterning does not coincide with the switchable compartments.

An analogous definition applies to the term "conductive section". To the contrary, isolating sections are understood to be sections which are not capable of conducting electricity to a relevant extent. In particular, they serve the purpose of isolating the conductive sections in the conductive layer from each other, by forming boundaries to electrical conduction. According to a preferred embodiment, the resistance between two conductive sections, which are delimited against each other by an isolating section is more than 1 MΩ, preferably more than 10 MΩ, particularly preferably more than 50 MΩ.

A straightforward means to create isolating sections in a conductive layer is to remove the conductive material in these positions. The skilled person is aware of methods suitable for this, in particular on a microscopic level, for example laser ablation, chemical etching, laser photolithography, mechanical embossing techniques, and photo embossing.

In another preferred embodiment, ITO (indium tin oxide) or similar conductive material coating is sputtered as a conductive layer while certain sections are covered. By later removal of the covering material it is possible to obtain a glass section without the conductive layer coating. In another preferred embodiment, the conductive material is only coated in specific sections by inkjet printing of solution processable conductors.

According to another preferred embodiment, the first conductive layer is not directly adjacent to the first substrate layer, and the second conductive layer is not directly adjacent to the second substrate layer, but a dielectric layer, which is preferably a barrier layer against ion migration is present between the respective substrate layer and the respective conductive layer.

Typical dielectric layer materials are commonly known to the expert, such as, for example, SiOx, SiNx, Cytop, Teflon, and PMMA.

The dielectric layer materials can be applied onto the substrate or electrode layer by conventional coating techniques like spin coating, roll-coating, blade coating, or vacuum deposition such as PVD or CVD. It can also be applied to the substrate or electrode layer by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is furthermore preferred that the stack of layers comprises at least one, preferably two alignment layers, which are positioned between the compartmented switching layer and the conductive layer, in direct contact with the compartmented switching layer material.

In case of a liquid crystalline switching material, the alignment of the LC that results from the alignment layer should be in correspondence with the desired mode of the switchable device (i.e. the required twist angle).

Preferably the alignment layer induces a homeotropic alignment, tilted homeotropic or planar alignment to the adjacent liquid crystal molecules.

Preferably, the alignment layer(s) is/are made of planar alignment layer materials, which are commonly known to the expert, such as, for example, layers made of polyimides.

In a preferred embodiment, the alignment layers are preferably rubbed by rubbing techniques known to the skilled person in the art.

The alignment layer materials can be applied onto the conductive layer by conventional coating techniques like spin coating, roll-coating, dip coating or blade coating. It can also be applied by vapour deposition or conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

The stack of layers of the device according to the present invention preferably comprises the following layers in the following sequence:
 first substrate layer
 first conductive layer
 first alignment layer
 compartmented switching layer
 second alignment layer
 second conductive layer
 second substrate layer.

According to one embodiment which is preferable in certain circumstances, the stack of layers of the switchable device comprises a polarizing layer, which is preferably positioned between one of the substrate layers and the compartmented switching layer, or on the outside of the substrate layer, on the face of the substrate layer which points away from the switching layer. Particularly preferably, the polarizing layer is positioned on the outside of the substrate layer, on the face of the substrate layer which points away from the compartmented switching layer.

According to a further embodiment which is preferable in certain circumstances, the stack of layers of the switchable device comprises two polarizing layers, one of which is positioned on one side of the compartmented switching layer, and the other on the opposite side of the compartmented switching layer.

The polarizing layers are selected from absorptive and reflective polarizing layers. The polarizing layers should be polarizing in the visible part of the spectrum. When used in outside facing windows, they should be light (or UV) stable. The transmission value for one polarization direction should preferably be less than 10%. The transmission value for the other polarization direction should preferably be more than 90%. The orientation of the polarizing layer should be perpendicular to the orientation of the adjacent liquid crystal alignment layer.

In another preferred embodiment, a polarizing layer can be optionally applied over at least one of the switching compartments of the device. The blocking axis of the polarizer is preferably perpendicular to the molecular orientation in the dark state of the switching layer in the compartment, to achieve a so-called Heilmeier mode device. The Heilmeier concept is beneficial for devices where a high contrast is desired, and a maximum transmission of less than 50% is acceptable.

In another preferred embodiment, the device according to the present invention comprises no polarizing layer.

The device according to the present invention may furthermore comprise filters, which block light of certain wavelengths, for example, IR or UV blocking layers.

A suitable UV blocking layer, blocks transmission of light with wavelengths in the range of 350 nm to 390 nm. Preferably, the UV blocking layer has a transmittance in the range of 350 nm to 390 nm of not more than 95%.

In accordance with the invention, further functional layers commonly known to the expert may also be present, such as, for example, protective films and/or compensation films.

Further, in particular circumstances, it is preferred that at least one of the first and the second substrate is attached to layer of solid material, preferably from glass or polymer. The attachment is preferably by means of lamination or glueing. Such embodiment is particularly preferable in applications of the device in windows of vehicles, such as cars.

It is preferred, in particular in order to obtain a higher contrast of switching, that the switchable device comprises a stack, comprising a first switchable device, as described above, and a second switchable device, as described above. Optionally, the first and second switchable devices are separated by a gas-filled space and spacers are positioned between the first and the second switchable device. Alternatively, the first and second switchable device are directly attached to each other using a laminate or optically clear adhesive.

In the case of a double cell device, the stack of layers preferably comprises the following layers in the following sequence:
 first substrate layer
 first conductive layer
 first alignment layer
 compartmented switching layer
 second alignment layer second conductive layer
second substrate layer
gas filled space and spacers enclosing it, or a lamination layer
first substrate layer (repeated)
first conductive layer (repeated)
first alignment layer (repeated)
compartmented switching layer (repeated)
second alignment layer (repeated)
second conductive layer (repeated)
second substrate layer (repeated).

Further, in case of the double LC cell setup described above, it is preferred that it comprises a stack, comprising a first switchable device and a second switchable device, where the orientation of the alignment layer of the first switchable device on the substrate adjacent to the second switchable device, and the orientation of the alignment layer in the second switchable device adjacent to the first switchable device, are perpendicular to each other.

Preferably, each of the separated compartments comprise each and independently a switching layer material which is switched by application of an electric field between at least two different switching states, where one of the states is a dark or scattering state, and the other state is a clear state.

According to an embodiment which is preferred under certain circumstances, at least one of the switching states of the device is a state in which the switching layer scatters light. According to an alternative preferred embodiment, none of the switching states of the device are scattering light. A dark state of the device is understood to be a non-scattering state where a relatively low proportion of light is transmitted through the device. A clear state of the device is understood to be a non-scattering state where a relatively high proportion of light is transmitted through the device. A scattering state of the device is understood to be a state in which the device is not transparent, due to the fact that light which is passing through the device is scattered.

The switching layer is kept between the two substrates with a main sealant, which follows the outer contours of the substrate. To achieve a compartmentalization of the switching layer, at least a second sealed compartment is created within the first, larger compartment by preferably applying another sealant border or polymer border.

Thus, the invention is also related to a switchable device, characterized in that the compartments are formed by surrounding solid borders and characterized in that the second compartment is formed by a surrounding solid border within the compartment of a first compartment. This second compartment is preferably filled with a different switching layer material, with respect to the first separated compartment.

Typical sealants are commonly known by the expert and can be selected from the commercial available materials. Sealants are materials that are applied by deposition methods such as dispensing or screenprinting. Common classes of sealant materials are epoxy based materials and acrylate materials. Preferably sealants are UV-curing or thermal curing materials, or a combination thereof. Suitable adhesive material is for example Norland Adhesive UVS 91 or Epoxy Technologies Epo-Tek OG-116-31.

In case of curing shrinkage of sealants, it may be beneficial to mix rigid spacer particle in the sealant to avoid cell gap deformation. Examples of spacer particles are glass fibres or polymer balls.

Alternatively, photoresist materials can be used to compartmentalize the switchable layer. Photoresists materials are materials that are structured by a photolithographic exposure and consequently removed in a development step. Examples of photoresist materials are novolac resins or epoxy based materials, such as SU-8 3000 from MicroChem Each switching layer material for the separated compartments are preferably each and independently selected from electrochromic switching layer material, suspended particle switching layer material, and/or liquid crystal switching layer material.

The liquid crystal switching layer material is preferably selected from a polymer comprising liquid crystal switching layer material and from a small molecule based liquid crystal switching layer material, preferably from a small molecule based liquid crystal switching layer material. According to another preferred embodiment, they based on a combination of polymer comprising liquid crystals and small molecule liquid crystals.

Further, it is preferred that each of the separated compartments of the liquid crystal switching layer material comprises at least one dichroic dye, wherein the dye concentration for each separated compartment of the liquid crystal switching layer is each and independly adjusted to achieve a different transmission range with respect to each other.

Preferable dichroic dyes to be used in each of the compartmented switching layer according to the present invention are independently selected benzothiadiazole dyes, such as disclosed in WO 2014/187529, diketopyrrolopyrrole dyes, such as disclosed in not yet published EP 13005918.1, thienothiadiazole dyes, rylene dyes, azo dyes, anthraquinone dyes, pyrromethene dyes and malononitrile dyes.

As mentioned above the dye concentration in each separated compartment of the liquid crystal switching layer is adjusted to achieve the desired transmission range. Typically, the total weight concentration of the dichroic dyes in the liquid crystalline switching layer are in the range from 0% to 10%, more preferably from 0.1% to 4%, even more preferably from 0.3% to 3%, most preferably from 0.5% to 2%.

In preferred embodiments, the total dye concentration in one compartment is at least a factor 0.9 lower than in another compartment. More preferably, the total dye concentration is at least a factor 0.5 lower than in another compartment.

In another preferred embodiment, the total dye concentration in two or more compartments are equal, but the individual dye concentrations differ by a factor of at least 0.9.

In yet another preferred embodiment, the composition of LC host mixture differs between the compartments. One variation could be the amount of chiral dopant. Another variation could be that the mixtures differ in the $\Delta\varepsilon$ of the mixture.

In a preferred embodiment, each separated compartment of the compartmented liquid crystal switching layer comprises a mixture of two or more, preferably of three or more dichroic dyes. Most preferably three dichroic dyes are at present. Preferably, the dichroic dyes have mutually complementing absorption spectra to each other, i. e. complementary absorption colours and are preferably mixed in a ratio relative to each other which results in a neutral colour of the combined absorption of the mixture, i. e. in a black appearance. This means that the absorption is almost constant over the visible spectral range.

According to one embodiment which is preferable under certain circumstances, the switching material for each of the separated compartments of the compartmented liquid crystal switching layer are each and independly selected from polymer comprising liquid crystal switching layers, preferably from polymer dispersed liquid crystal (PDLC) switching layers.

Preferably, each of the separated compartments of the compartmented liquid crystal switching layer comprises each and independently one or more dichroic dyes dissolved in a liquid crystalline material, where the liquid crystalline material preferably comprises one or more liquid crystalline organic compounds, which are selected from small molecules and polymeric materials, preferably from small molecules.

Preferred liquid crystal materials to be used in the compartmented switching layer according to the present invention are disclosed in the following applications: WO 2014/090367, not yet disclosed PCT/EP2014/003153 and not yet disclosed EP 14001335.0.

Preferably, the liquid crystalline material is in at least one of the switching states in a nematic liquid crystalline state, more preferably in all of the switching states.

Preferably, in the dark state, the liquid crystalline material is in a planar state, whereas in the clear state, the liquid crystalline material is in a homeotropic state. In this case, the homeotropic state is achieved by application of an electrical field to the switchable layer. Other modes of function of the liquid crystal switching layers are however possible, and selected by the skilled person based on his knowledge in the field of liquid crystal based switching devices.

It is furthermore preferred that in the dark state, the liquid crystalline material is in a state selected from nematic non-twisted, nematic twisted and nematic supertwisted, whereas in the clear state, the material is in a homeotropic state.

Preferred liquid-crystalline materials for the device in accordance with the present invention comprise one or more, preferably at least 3, particularly preferably at least 4 and very particularly preferably at least 5, different liquid-crystalline compounds. If only one liquid crystalline compound is employed, a typical concentration ranges from about 80 to 99% by weight of the total mixture.

The liquid-crystalline material in accordance with the present invention optionally comprises further compounds, for example stabilisers and/or chiral dopants. Compounds of this type are known to the person skilled in the art. They are preferably employed in a concentration of 0% to 30%, particularly preferably 0.1% to 20%, and very particularly preferably 0.1% to 10%.

In accordance with the invention, the liquid-crystalline material can have positive dielectric anisotropy $\Delta\varepsilon$. In this case, $\Delta\varepsilon$ preferably has a value of $\geq 1.5$.

In accordance with the invention, the liquid-crystalline material can have negative dielectric anisotropy $\Delta\varepsilon$. In this case, $\Delta\varepsilon$ preferably has a value of $\leq -1.5$.

In accordance with the invention, the liquid-crystalline material can furthermore have a low positive or negative dielectric anisotropy $\Delta\varepsilon$. In this case, the following preferably applies to $\Delta\varepsilon$: $-1.5 < \Delta\varepsilon < 1.5$, and particularly preferably applies to $-1.0 < \Delta\varepsilon < 1.0$.

$\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{ave.}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

The liquid-crystalline material preferably has a nematic phase in a temperature range from 0° C. to 50° C., more preferably in the range from −20° C. to 80° C., even more preferably in the range from −40° C. to 100° C.

Typically, the device in accordance is made by providing the top and bottom substrate with the conductive layer and an appropriate alignment layer. Spacer particles and the first and second sealant are then applied on the bottom substrate. Using one-drop-filling technology, the required amount of switching layer material is provided in the first and in the second compartment. In a vacuum environment, the top substrate is placed on the bottom substrate. The substrates are pressed together onto the spacer particles, to achieve a homogeneous cell gap. The sealants are then cured using heat and/or light.

Thus the invention further relates to a process for the production of a switchable device according to the present application comprising the steps
  cutting and cleaning of the substrates,
  providing the conductive layer on each of the substrates,
  providing an alignment layer on the conductive layer,
  providing spacer particles and sealant on one of the substrates, whereby at least two different compartments are defined by the applied sealant which borders the different compartment,
  filling the a first compartment with the switching layer material
  filling at least a second compartment with a different switching layer material
  assembling the cell
  curing of the sealant by using UV or heat.

In another embodiment the device according to the present invention can also be obtained by utilizing vacuum filling technology. A prerequisite for this manufacturing technology is that both compartments have an LC filling port at the edge of the glass (although not necessarily the same edge). In this case, the empty cell is prepared first. Therefore the first and second substrate are provided with an conductive layer, an alignment layer and spacers. The sealant pattern for at least two different compartments is made on the substrate, whereby one or more fill ports (openings) are left by not applying a sealant such that each compartment can be filled with switching layer material at a later stage of the process. The two substrates are assembled together and the sealant is cured. The LC cell is then filled using a vacuum process, wherein each filling port is brought into contact with a reservoir of switching layer material that should be filled in that compartment. After filling, the device is pressed, the filling ports are closed using a sealant and the sealant is cured.

The functional principle of the device according to the invention will be explained in detail below. It is noted that no restriction of the scope of the claimed invention, which is not present in the claims, is to be derived from the comments on the assumed way of functioning.

The switching mechanism of dye doped liquid crystal (ddLC) device is based on the reorientation of dye molecules between a high absorbing and a low absorbing state. The orientation of the dye is controlled by the alignment of the liquid crystals in which they are dissolved. The liquid crystal alignment is in turn controlled by the alignment material on the substrate and the applied electrical fields. To achieve a second switching range, at least a second sealed compartment is created within the first compartment. This second compartment is filled with a different ddLC material, wherein the dye concentration is adjusted to achieve the second transmission range.

In case multiple dyes are used in the dye doped LC mixture, the ratio of the dyes can also be changed in order to achieve two or more different colors in the different compartments.

The invention furthermore relates to a window, comprising a switchable device as described above, preferably characterized in that it comprises an insulated glass unit, where the switchable device is positioned inside of the insulated glass unit.

The invention furthermore relates to the use of a switchable device according to the present application or of a window according to the present application in a building or in a vehicle. Vehicles are meant to include, among others and particularly, cars, buses, vessels, trains, streetcars, and airplanes. The term building is meant to include containers or mobile or temporary buildings.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B unless specified otherwise or clear from the context.

In addition, the articles "a" and "an" as used in this application and the appended claims should generally be construed to mean "one or more" unless specified otherwise or clear from the context to be directed to a singular form.

Moreover, throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The parameter ranges indicated in this application all include the limit values including the maximum permissible errors as known by the expert. The different upper and lower limit values indicated for various ranges of properties in combination with one another give rise to additional preferred ranges.

The following examples are intended to explain the invention without restricting it. The methods, structures and properties described hereinafter can also be applied or transferred to materials that are claimed in this invention but not explicitly described in the foregoing specification or in the examples.

Figure 1:
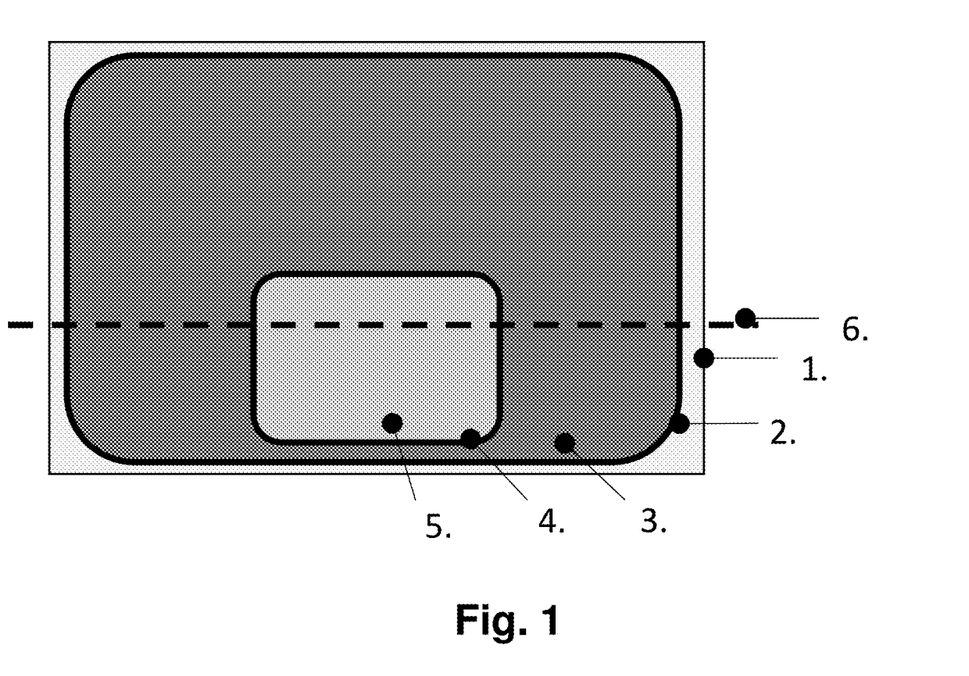
FIG. 1 shows a top view of a switchable device according to the present application.
Figure 2:
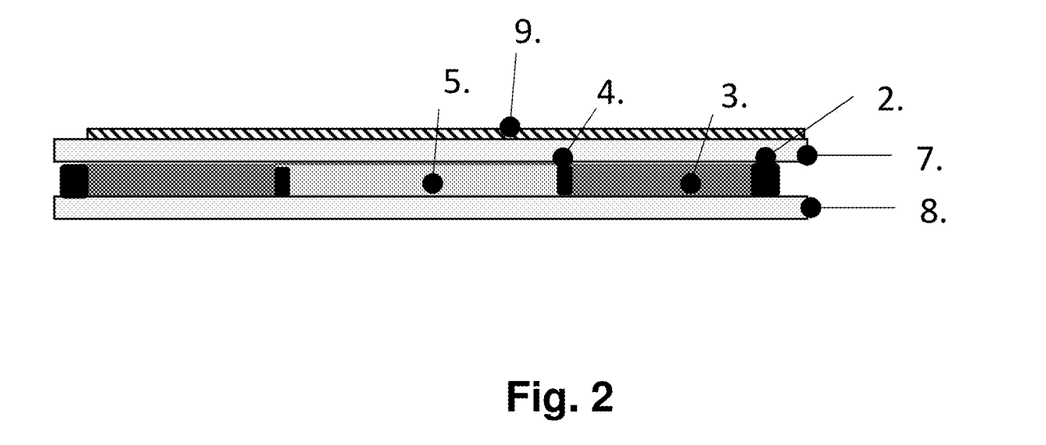
FIG. 2 shows a cross sectional view of a the stack of layers of a switchable device according to the present application.
Figure 3:
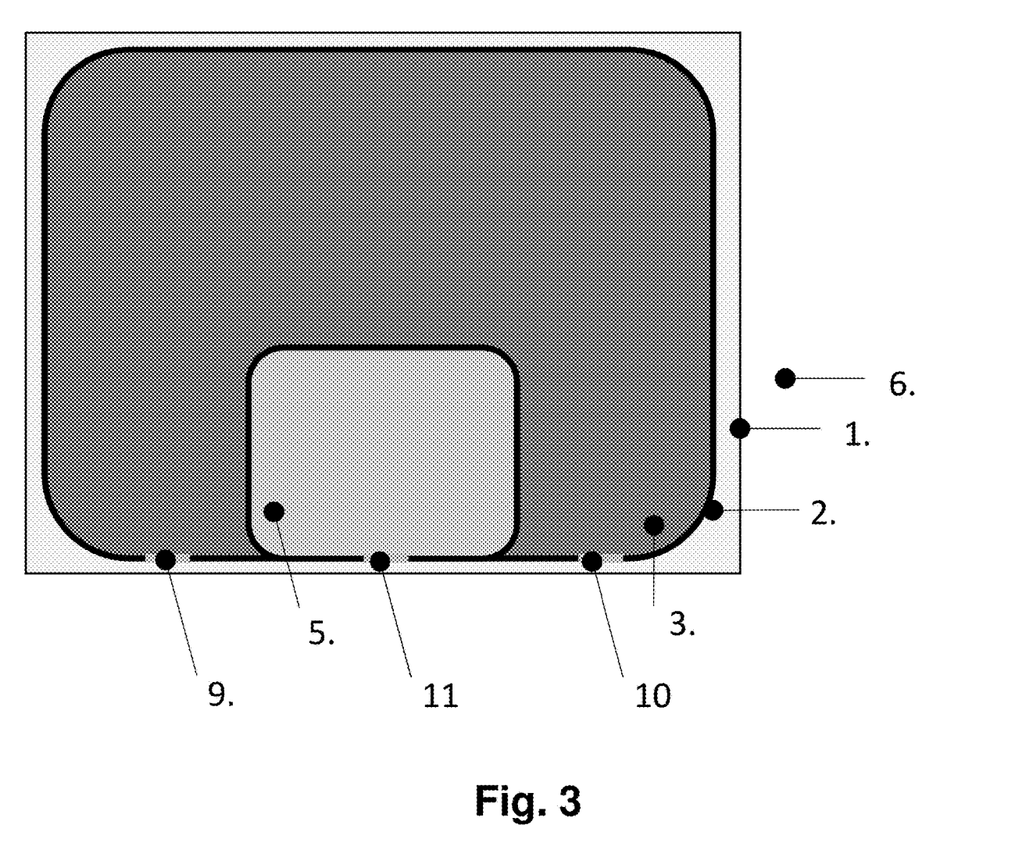
FIG. 3 shows a top view of a switchable device according to the present application, being especially suitable for vacuum filling manufacturing process.
Figure 4:
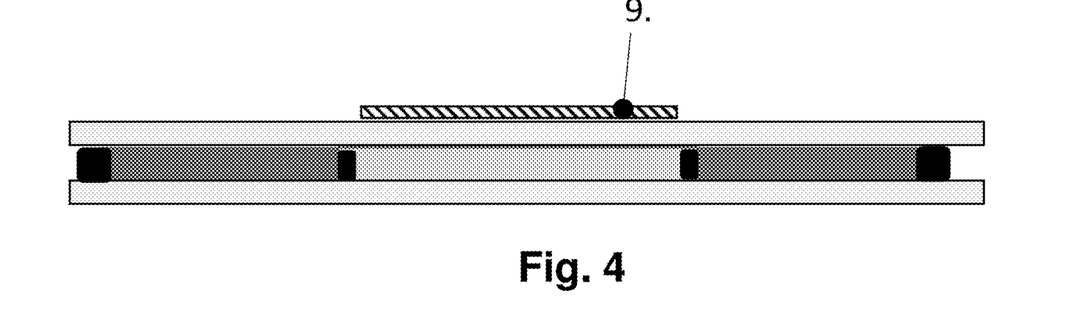
FIG. 4 shows a cross sectional view of a switchable device according to the present application in accordance with the Heilmeier concept.

LISTING OF REFERENCE NUMBERS 1. outer contours of the substrate
2. first main sealant
3. first compartment comprising a first switching layer material
4. second sealant
5. second compartment comprising a second switching layer material
6. cross sectional view
7. first substrate
8. second substrate
9. position of optional additional layers (UV filter, IR Filter etc.)
10. filling port for vacuum filling of the first compartment
11. filling port for vacuum filling of the second compartment The following working examples serve to illustrate the present invention. They are not to be construed as limiting the invention in any way beyond the limitations as set out in the claims.

WORKING EXAMPLES

1) Preparation of a switchable window having a segmented structure. In this working example the first compartment has a switching range with low visible transmission from 25-50% the second compartment has a switching range with high visible transmission from 45-70%.

Two identical glass substrates with ITO conductive coating (100 Ohms/square) are cleaned using a mild alkaline solution (Merck Extran MA01). Polyimide solution JSR AL1051 is printed on the ITO surface of both substrates and baked at 200 degrees C. for 60 minutes, so as to leave about 100 nm of PI layer on top of the ITO. Both substrates are rubbed with a velvet rubbing cloth, with rubbing in opposite direction so as to achieve anti-parallel alignment.

Polymer spacer balls with a diameter of 25 micrometers are distributed randomly over the first substrate. Adhesive Norland UVS-91 is plotted on the 2nd substrate, with a pattern that creates 2 compartments.

Furthermore, each compartment has a sealant gap along the glass edge. The first plate is placed on top of the 2nd plate with 44 mm offset along one side, so that both ITO layers remain exposed. The two glass substrates are sucked together with a vacuum bag to 0.4 bar and exposed to UV light during 10 minutes to fully cure the adhesive. The cell is placed vertically in an LC filling tool with the two filling ports pointing down. The LC cell is evacuated to 1·10−2 mbar. When that vacuum is reached, each of the filling ports is brought into contact with the LC mixtures: filling port 1 with the mixture with three times higher dye concentration, filling port 2 with the standard mixture.

Vacuum is released in a controlled fashion over a period of 1 hour while the filling ports remain in contact with the LC, so that the LC fills the respective compartments. When atmospheric pressure has been reached and both compartments have filled, the cell is removed from the filling tool and placed in a press with the filling ports pointing up. The cell is pressed to squeeze out excess LC mixture. Sealant Norland 68T is applied on the filling ports and cured with UV light.

Electrodes are connected to each of the substrates. When a voltage of 12 V AC (60 Hz) is applied, the first compartment switches from 25% transmittance to 50% transmittance, while the second compartment switches simultaneously from 45% transmittance to 70%.

The invention claimed is:

1. A window apparatus comprising:
   a window and a switchable device for regulation of light transmission,
   wherein said switchable device comprises:
   a stack of layers which comprises a first substrate layer, a second substrate layer, a switching layer positioned between the first substrate layer and the second substrate layer wherein said switching layer comprises at least two separated compartments, a first conductive layer which is positioned between the switching layer and the first substrate layer, and a second conductive layer which is positioned between the switching layer and the second substrate layer, wherein said at least two separated compartments of said switching layer comprise a first compartment and a second compartment,
   where each of the separated compartments of the switching layer comprises a material which changes light transmissivity upon application of a voltage, and the first compartment comprises a different composition of a switching layer material than the second compartment,
   wherein the material in each of the compartments of the switching layer is, in each case independently, a liquid crystal switching layer material, and wherein the switching layer material of each compartment comprises one or more dichroic dyes dissolved in a liquid crystalline material,
   wherein the separated compartments are formed by surrounding solid borders and said second compartment is formed by a surrounding solid border within the compartment of said first compartment.

2. The window apparatus according to claim 1, wherein at least one of the separated compartments is switched by application of an electric field between at least two different switching states, where one of the states is a dark state, and the other state is a clear state.

3. The window apparatus according to claim 1, wherein each separated compartment is switched individually by application of an electric field between at least two different switching states.

4. The window apparatus according to claim 1, wherein each compartment shows a different transmission while being switched by application of an electric field between at least two different switching states, individually.

5. The window apparatus according to claim 1, wherein isolating sections of each conducting layer are created by a method selected from laser ablation, chemical etching, laser photolithography, mechanical embossing techniques, and photo embossing; or by sputtering an ITO (indium tin oxide) or similar conductive material coating as a conductive layer while certain sections are covered, and later on remove the covering material to obtain a glass section without the coating; or by coating conductive material only in specific sections by inkjet printing of solution processable conductors.

6. The window apparatus according to claim 1, wherein the liquid crystal switching layer material is selected from polymer comprising liquid crystal switching layer materials and from small molecule based liquid crystal switching layer materials.

7. The window apparatus according to claim 1, wherein the liquid crystal switching layer material is selected from polymer comprising liquid crystal switching layer materials, which are polymer dispersed liquid crystal switching layer materials.

8. The window apparatus according to claim 1, wherein the liquid crystalline material comprises one or more liquid crystalline organic compounds, which are selected from small molecules and polymeric materials.

9. The window apparatus according to claim 8, wherein in a dark state, the liquid crystalline material is in a state selected from nematic non-twisted, nematic twisted and nematic supertwisted, whereas in a clear state, the liquid crystalline material is in a homeotropic state.

10. The window apparatus according to claim 1, wherein said apparatus comprises two of said switchable devices in a stack.

11. The window apparatus according to claim 1, further comprising a separate touch sensitive device.

12. The window apparatus according to claim 1, wherein said window is an insulated glass unit, and said switchable device is positioned inside of the insulated glass unit.

13. The window apparatus according to claim 11, wherein said separate touch sensitive device is positioned on a frame of the window.

14. The window apparatus according to claim 1, wherein the liquid crystal switching layer material in each compartment comprises at least one dichroic dye, wherein the dye concentration is in the range from 0.1% to 10%.

15. The window apparatus according to claim 1, wherein the liquid crystal switching layer material in each compartment comprises a stabilizer, wherein the stabilizer concentration is 0.1% to 30%.

16. The window apparatus according to claim 1, wherein the liquid crystal switching layer material in each compartment comprises a chiral dopant, wherein the chiral dopant concentration is 0.1% to 30%.

17. The window apparatus according to claim 1, wherein the liquid crystal switching layer material in each compartment has a nematic phase in a temperature range from 0° C. to 50° C.

* * * * *